US009379782B2

(12) United States Patent
Kang et al.

(10) Patent No.: US 9,379,782 B2
(45) Date of Patent: Jun. 28, 2016

(54) METHOD OF ADJUSTING A CARD EMULATION MODE AND AN ELECTRONIC DEVICE THEREFOR

(71) Applicants: Moon-Seok Kang, Gyeonggi-do (KR); Byoung-Hak Jin, Incheon (KR)

(72) Inventors: Moon-Seok Kang, Gyeonggi-do (KR); Byoung-Hak Jin, Incheon (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 525 days.

(21) Appl. No.: 13/854,247

(22) Filed: Apr. 1, 2013

(65) Prior Publication Data

US 2013/0271269 A1 Oct. 17, 2013

(30) Foreign Application Priority Data

Apr. 16, 2012 (KR) .................. 10-2012-0039144

(51) Int. Cl.
| | |
|---|---|
| *H04B 5/00* | (2006.01) |
| *H04B 7/00* | (2006.01) |
| *H04W 4/00* | (2009.01) |
| *H04Q 5/22* | (2006.01) |

(52) U.S. Cl.
CPC ............ *H04B 5/0062* (2013.01); *H04B 5/0025* (2013.01); *H04B 5/0031* (2013.01); *H04B 5/0056* (2013.01); *H04B 5/0068* (2013.01); *H04W 4/001* (2013.01); *H04W 4/008* (2013.01)

(58) Field of Classification Search
CPC .......... G06K 7/10237; G06K 19/0723; H04W 4/008; G06Q 20/32
USPC ..................... 340/10.5–10.51; 455/41.1–41.3
See application file for complete search history.

(56) References Cited

U.S. PATENT DOCUMENTS

| | | | | |
|---|---|---|---|---|
| 8,912,886 | B2 * | 12/2014 | Hakata et al. ................ | 340/5.91 |
| 8,923,761 | B2 * | 12/2014 | Hillan .......................... | 455/41.1 |
| 2005/0225437 | A1 * | 10/2005 | Shiotsu et al. ............. | 340/10.51 |
| 2006/0229113 | A1 | 10/2006 | Rowse | |
| 2008/0129457 | A1 * | 6/2008 | Ritter et al. .................. | 340/10.1 |
| 2008/0224825 | A1 * | 9/2008 | Nystrom et al. ............. | 340/10.1 |
| 2009/0051533 | A1 * | 2/2009 | Roesner ..................... | 340/572.1 |
| 2009/0143104 | A1 * | 6/2009 | Loh et al. ...................... | 455/558 |
| 2009/0146796 | A1 * | 6/2009 | Goto et al. ................. | 340/10.51 |
| 2010/0066511 | A1 * | 3/2010 | Barnett et al. ............. | 340/10.51 |
| 2010/0082485 | A1 * | 4/2010 | Lin et al. ......................... | 705/44 |
| 2011/0022755 | A1 * | 1/2011 | Sueyoshi et al. ............. | 710/109 |
| 2012/0040608 | A1 * | 2/2012 | Walker et al. ................ | 455/13.2 |
| 2012/0040611 | A1 * | 2/2012 | Griffin et al. ................ | 455/41.1 |
| 2012/0100804 | A1 * | 4/2012 | Miles ........................... | 455/41.1 |
| 2013/0002318 | A1 * | 1/2013 | Lu et al. ....................... | 327/156 |
| 2013/0137371 | A1 * | 5/2013 | Haverinen ................... | 455/41.1 |
| 2013/0203346 | A1 * | 8/2013 | Han ............................. | 455/41.1 |

(Continued)

OTHER PUBLICATIONS

Langer, Josef, et al.; "NFC—Technologie;" In: 'Anwendungen and Technik von Near Field Communication (NFC);' Jan. 1, 2010; XP055020102.

*Primary Examiner* — Hai Phan
*Assistant Examiner* — Son M Tang
(74) *Attorney, Agent, or Firm* — Cha & Reiter, LLC (57) ABSTRACT

A method monitors near field communication (NFC) modes performed by a user and automatically adjusts the periods of the NFC modes according to a frequency of use of each of the NFC modes, and an electronic operates using the method. The method includes determining whether NFC is performed within a set time, monitoring a frequency of use of the performed NFC mode when it is determined that the NFC is performed, and adjusting a period of a card emulation mode according to the frequency of use of the NFC mode.

16 Claims, 6 Drawing Sheets

(56) References Cited

U.S. PATENT DOCUMENTS

| | | | |
|---|---|---|---|
| 2013/0215467 A1* | 8/2013 | Fein et al. | 358/1.15 |
| 2013/0225075 A1* | 8/2013 | Schmid | G06Q 20/12 455/41.1 |
| 2013/0281013 A1* | 10/2013 | Hillan | 455/41.1 |
| 2014/0101755 A1* | 4/2014 | Tang | 726/20 |
| 2014/0158703 A1* | 6/2014 | Niinisto et al. | 221/1 |
| 2015/0080021 A1* | 3/2015 | Bietz et al. | 455/456.1 |
| 2015/0126115 A1* | 5/2015 | Yun et al. | 455/41.1 |

* cited by examiner

METHOD OF ADJUSTING A CARD EMULATION MODE AND AN ELECTRONIC DEVICE THEREFOR

This application claims, pursuant to 35 U.S.C. §119(a), priority to and the benefit of the earlier filing date of a Korean patent application filed in the Korean Intellectual Property Office on Apr. 16, 2012 and assigned Serial No. 10-2012-0039144, the entire disclosure of which is hereby incorporated by reference.

BACKGROUND OF THE INVENTION

1. Field of the Invention

The present invention relates to Near Field Communication (NFC), and in particular to a method of monitoring Near Field Communication (NFC) modes and adjusting periods of the NFC modes and an electronic device therefor.

2. Description of the Related Art

While functions of an electronic device are improved rapidly, various short-range communication types such as a Radio Frequency IDentification (RFID) type and an NFC type as well as non-contact charge types such as an electromagnetic induction type and a resonance type have been introduced into the electronic devices of the prior art.

NFC is short-range wireless communication for transmitting data at low power in a distance within 10 centimeters using frequencies of 13.56 MHz bands. A standard of the NFC known for use in one field of RFID is defined in the International Organization for Standardization (ISO) 18092 standard document. NFC modes of this particular NFC protocol include a card emulation mode, a read/write mode, and a Peer to Peer (P2P) mode. The respective NFC modes are sequentially repeated by a set period.

However, when a user performs NFC using an electronic device in the prior art, an NFC mode which is currently set in the electronic device may differ from an NFC mode which is currently being performed. That is, there is a problem in that the user must wait until a period of the NFC mode which is currently being performed is completed before a desired NFC mode is started.

The above-described problem occurs in that not only a time delay is generated but also a mode, to which a standardized period is applied, occurs without considering a frequency of use of an NFC mode per user.

SUMMARY OF THE INVENTION

An aspect of the present invention is to solve at least the above-mentioned problems and/or disadvantages and to provide at least the advantages described below. Accordingly, an aspect of the present invention is to provide an apparatus and method for monitoring NFC modes performed by a user and automatically adjusting periods of the NFC modes according to a frequency of use by each of the NFC modes.

Another aspect of the present invention is to provide an apparatus and method for improving convenience of a user in consideration of a frequency of use of a user without applying a standardized NFC mode.

Another aspect of the present invention is to provide an apparatus and method for improving a recognition speed of a card emulation mode and minimizing power consumption of an electronic device by adjusting a period of the card emulation mode among NFC modes.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

DETAILED DESCRIPTION OF THE INVENTION

Exemplary embodiments of the present invention will be described herein below with reference to the accompanying drawings. In the following description, well-known functions or constructions are not described in detail since they would obscure the invention in unnecessary detail. The present invention may, however, be embodied in many different forms and should not be construed as limited to the exemplary embodiments set forth herein. In addition, terms described herein, which are defined with reference to the functions of the present invention, may be implemented differently depending on a user or operator's intention and practice. Therefore, the terms should be understood on the basis of the disclosure throughout the specification. The principles and features of this invention may be employed in varied and numerous embodiments without departing from the scope of the invention.

The same reference numbers are used throughout the drawings to refer to the same or like parts. Furthermore, although the drawings represent exemplary embodiments of the invention, the drawings are not necessarily to scale and certain features may be exaggerated or omitted in order to more clearly illustrate and explain the present invention.

Among the terms set forth herein, a terminal refers to any kind of device capable of processing data which is transmitted or received to or from any external entity. The terminal may display icons or menus on a screen to which stored data and various executable functions are assigned or mapped. The terminal may include a computer, a notebook, a tablet PC, a mobile device, and the like.

Among the terms set forth herein, a screen refers to a display or other output devices which visually display information to the user, and which optionally are capable of receiving and electronically processing tactile inputs from a user using a stylo, a finger of the user, or other techniques for conveying a user selection from the user to the output devices.

Among the terms set forth herein, an icon refers to a graphical element such as a figure or a symbol displayed on the screen of the device such that a user can easily select a desired function or data. In particular, each icon has a mapping relation with any function being executable in the device or with any data stored in the device and is used for processing functions or selecting data in the device. When a user selects one of the displayed icons, the device identifies a particular function or data associated with the selected icon. Then the device executes the identified function or displays the identified data.

Among the terms set forth herein, data refers to any kind of information processed by the device, including text and/or images received from any external entities, messages transmitted or received, and information created when a specific function is executed by the device.

Figure 1:
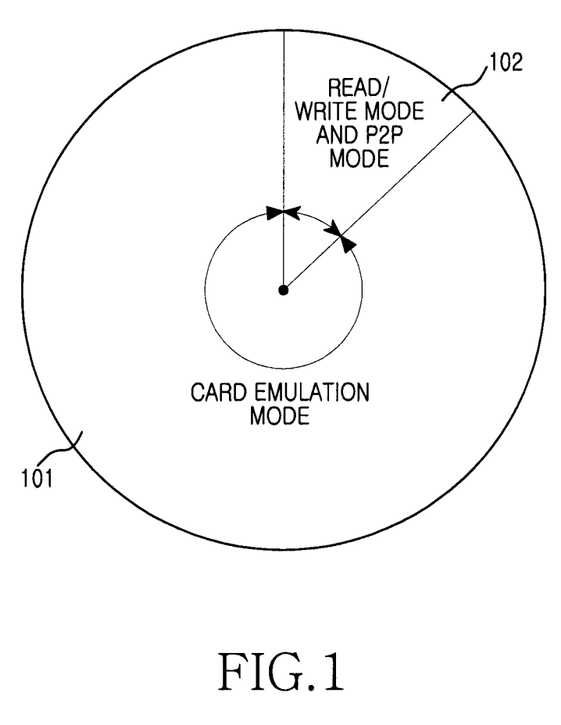
FIG. 1 illustrates periods of NFC modes according to an exemplary embodiment of the present invention.

FIG. 1 illustrates periods of NFC modes according to an exemplary embodiment of the present invention.

First of all, NFC is short-range wireless communication for transmitting data at low power in a distance within 10 centimeters using frequencies having 13.56 MHz bands. A standard of the NFC known for use in one field of RFID is defined in International Organization for Standardization (ISO) 18092 standard document. As shown in FIG. 1, NFC modes are represented in a clock-like format, and include a card emulation mode in a first period 101 and a read/write mode and a Peer to Peer (P2P) mode in a second period 102. The respective NFC modes are sequentially repeated by a set period in the clock-like format. In more detail, the NFC modes include three modes, with the card emulation mode in the first period 101, and the read/write mode and the P2P mode in the second period 102. A period of each of the modes, such as the periods 101, 102, may be changed by a setting of a user.

Hereinafter, when the user performs NFC using an electronic device, a description of the present invention will now be given for the respective modes in more detail.

First, the card emulation mode 101 among the NFC modes, performed in the first period 101, is a mode used when transmitting and receiving information between an external reader and the electronic device. For example, the user may move an electronic device having a transportation card function to be close to a reader and may pay transportation fees. Also, the user moves an electronic device having a pass card function to be close to an external recognizing device which is positioned on a door of home or an office and may enter the home or the office. In more detail, the external reader generates a Radio Frequency (RF) magnetic field to perform NFC with the electronic device. The electronic device receives power from the RF magnetic field generated by the external reader. Accordingly, because the electronic device receives power from the external reader, an enormous amount of power is not consumed in the card emulation mode.

Next, the read/write mode among the NFC modes, performed in the second period 102, is a mode for inputting certain information to an RFID tag and recognizing RFID tag information, when the user moves the electronic device to be close to the RFID tag. In more detail, the electronic device must generate an RF magnetic field to input the certain information to the RFID tag or recognize the RFID tag information. That is, because the electronic device generates the RF magnetic field, and inputs the certain information to the RFID tag or recognizes the RFID tag information, an enormous amount of power is consumed in the read/write mode.

Finally, the P2P mode, performed in the period 102, is a mode used when transmitting and receiving information between electronic devices. In more detail, because each of the electronic devices generates an RF magnetic field, an enormous amount of power is consumed in the P2P mode, in a manner similar to the read/write mode during the same period 102.

As described above, the NFC modes include the card emulation mode, the read/write mode, and the P2P mode. The respective NFC modes are sequentially repeated by set periods 101, 102. In the event that the user moves an electronic device having an NFC function to be close to an external reader, the user may be required to pay transportation fees. In the electronic device having the NFC function, the card emulation mode, the read/write mode, and the P2P mode are sequentially repeated according to set periods. Accordingly, if a period of an NFC mode is located during performance of the read/write mode and the P2P mode, the user must wait until a period of the card emulation mode is started to perform card emulation. Also, when the user inputs certain information to an RFID tag using the electronic device, if a period of the NFC mode is located during performance of the card emulation mode and the P2P mode, if the P2P mode is in a separate period, the user or the electronic device must wait until a period of the read/write mode is started to perform read/write operations. That is, when the user performs NFC using an electronic device in the prior art, because NFC modes are uniformly repeated, there is a problem in that convenience of the user is not reflected. In more detail, there is a problem in that there is no method of automatically adjusting a period of an NFC mode according to an NFC mode frequently used by the user. However, in accordance with the exemplary embodiment of the present invention, there is a method of monitoring an NFC mode performed within a time set by the user and efficiently adjusting an NFC mode in the electronic device.

Figure 2A:
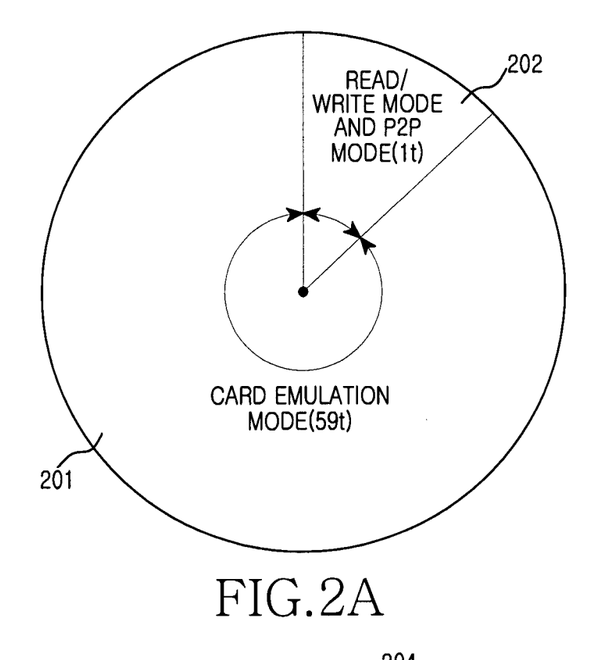
FIGS. 2A and 2B illustrate a process of adjusting a period of a card emulation mode according to the exemplary embodiment of the present invention.
Figure 2B:
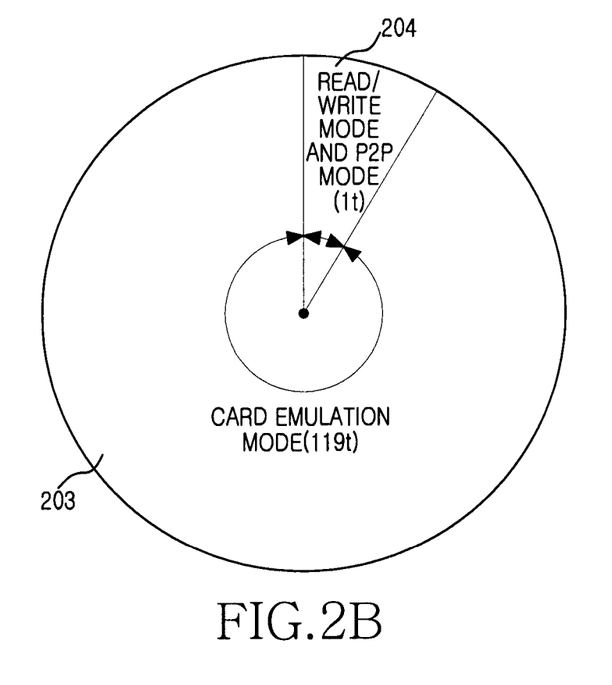

FIGS. 2A and 2B illustrate a process of adjusting a period of a card emulation mode according to the exemplary embodiment of the present invention. FIG. 2A illustrates periods of NFC modes according to default values which are set for the first time. In more detail, when an electronic device performs NFC, periods of NFC modes are set according to default values which are set for the first time.

A description of the present invention will now be given with reference to FIG. 2A.

An initial default value is set to, for example, 59t in a period 201 of a card emulation mode and an initial default value is set to, for example, 1t in a period 202 of a read/write mode and P2P mode, where the parameter "t" is a predetermined time unit, such as 1 ms. In more detail, the entire period for NFC modes set by a user is 60t. In 60t, which is the entire period for NFC modes, the period 201 of the card emulation mode is set to, for example, 59t and the period 202 of the read/write mode and P2P mode is set to, for example, 1t. That is, a time rate of 59/60 corresponds to the period 201 of the card emulation mode and a time rate of 1/60 corresponds to the period 202 of the read/write mode and P2P mode, among NFC modes of the electronic device. Accordingly, when the user wants to perform NFC necessary for performing the card emulation mode using the electronic device, a rate at which NFC may be performed without a time delay is 59/60. In the same sense, when the user wants to perform NFC necessary for performing the card emulation mode, a time rate capable of being delayed is 1/60. On the other hand, when the user wants to perform NFC necessary for performing the read/write mode and P2P mode using the electronic device, a rate at which NFC may be performed without a time delay is 1/60. In the same sense, when the user wants to perform NFC necessary for performing the read/write mode and P2P mode, a time rate capable of being delayed is 59/60.

FIG. 2B illustrates a changed period of a card emulation mode according to the exemplary embodiment of the present invention.

When a user performs NFC using an electronic device in the prior art, because NFC modes are uniformly repeated, there is a problem in that convenience of the user is not reflected. That is, there is a problem in that there is no method of adjusting a period of an NFC mode according to an NFC mode frequently used by the user. However, in accordance with the exemplary embodiment of the present invention, there is a method of monitoring an NFC mode performed within a set time in real time and efficiently adjusting a period of the NFC mode.

A description of the present invention will now be given with reference to FIG. 2B.

It may be verified that 59t which is the initial default value of the period 201 of the card emulation mode of FIG. 2A is changed to 119t which is an initial default value of a new period 203 of the card emulation mode. In more detail, in accordance with the exemplary embodiment of the present invention, if an electronic device determines that NFC is performed, the electronic device monitors the performed NFC mode in real time and adjusts a period 203 of the card emulation mode according to the frequency of use of the NFC mode of the user automatically. As shown in FIG. 2B, the electronic device verifies that the frequency of use of the card emulation mode is high and adjusts the period 203 of the card emulation mode from 59t to 119t. Accordingly, after the electronic device adjusts the period 203 of the card emulation mode automatically from 59t to 119t, if the entire period of the NFC modes is converted into a time rate, a time rate of 119/120 corresponds to the card emulation mode and a time rate of 1/120 corresponds to a read/write mode/P2P mode having a period 204 of 1t which has not been changed. Therefore, when the user wants to perform NFC necessary for performing the card emulation mode using the electronic device, a rate at which NFC may be performed without a time delay is 119/120. In the same sense, when the user wants to perform NFC necessary for performing the card emulation mode, a time rate capable of being delayed is 1/120. On the other hand, when the user wants to perform NFC necessary for performing the read/write mode and P2P mode, a rate at which NFC may be performed without a time delay is 1/120. In the same sense, when the user wants to perform NFC necessary for performing the read/write mode and P2P mode, a time rate capable of being delayed is 119/120. However, it may be verified that the period 204 of the read/write mode and P2P mode is fixed to 1t. In more detail, in accordance with the exemplary embodiment of the present invention, the electronic device adjusts only the period 203 of the card emulation mode and does not adjust the period 204 of the read/write mode and P2P mode, among NFC modes.

As described above, when an NFC mode is performed, the electronic device according to the exemplary embodiment of the present invention monitors the frequency of use of the performed NFC mode in real time and adjusts periods of the respective NFC modes automatically. Accordingly, the electronic device has an advantage in that a probability in which a communication delay will occur when the user performs NFC may be greatly reduced and power consumption of the electronic device may be reduced although a period of the card emulation mode is increased. Herein, it is clear that an increased period of the card emulation mode may not be greater than a maximum threshold value, such as 120t, although the period of the card emulation mode is increased. That is, this is because a minimum period of the read/write mode and P2P mode must exist although the electronic device determines that the frequency of use of the card emulation mode is high.

Figure 3A:
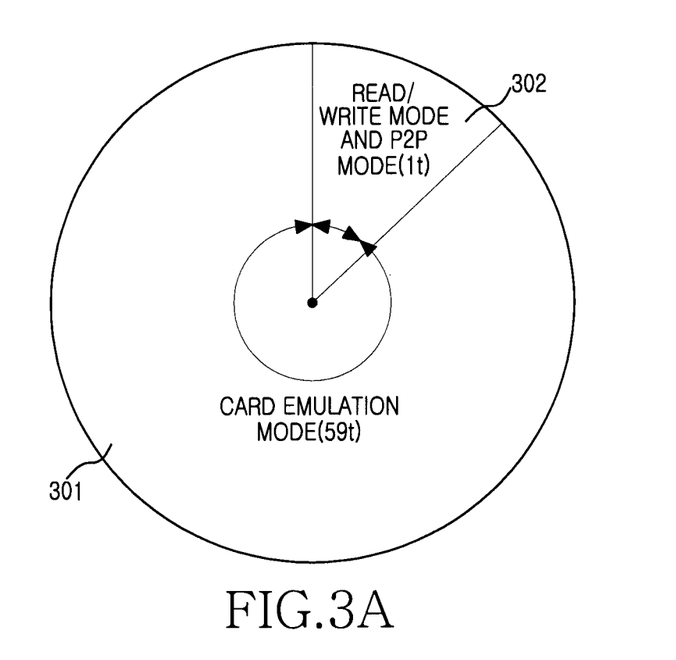
FIGS. 3A and 3B illustrate a process of adjusting a period of a card emulation mode according to an alternative exemplary embodiment of the present invention.
Figure 3B:
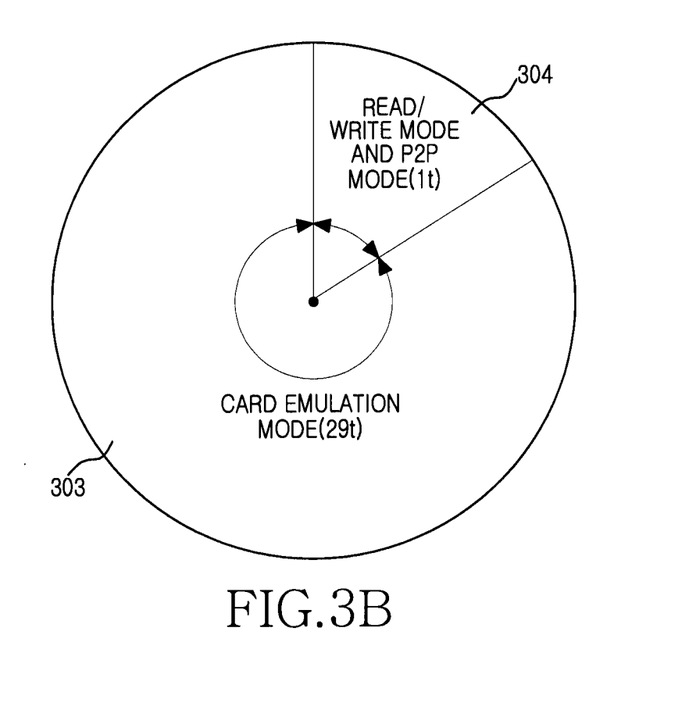

FIGS. 3A and 3B illustrate a process of adjusting a period of a card emulation mode according to an alternative exemplary embodiment of the present invention. FIG. 3A illustrates periods of NFC modes according to default values which are set for the first time. In more detail, when an electronic device performs NFC, periods of NFC modes are set according to default values which are set for the first time.

A description of the present invention will now be given with reference to FIG. 3A.

An initial default value is set to, for example, 59t in a period 301 of a card emulation mode and an initial default value is set to, for example, 1t in a period 302 of a read/write mode and P2P mode. In more detail, the entire period set by a user is 60t. In 60t which is the entire period for NFC modes, the period 301 of the card emulation mode is set to 59t and the period 302 of the read/write mode and P2P mode is set to 1t. That is, a time rate of 59/60 corresponds to the period 301 of the card emulation mode and a time rate of 1/60 corresponds to the period 302 of the read/write mode and P2P mode, among NFC modes of the electronic device. Accordingly, when the user wants to perform NFC necessary for performing the card emulation mode using the electronic device, a rate at which NFC may be performed without a time delay is 59/60. In the same sense, when the user wants to perform NFC necessary for performing the card emulation mode, a time rate capable of being delayed is 1/60. On the other hand, when the user wants to perform NFC necessary for performing the read/write mode and P2P mode using the electronic device, a rate at which NFC may be performed without a time delay is 1/60. In the same sense, when the user wants to perform NFC necessary for performing the read/write mode and P2P mode, a time rate capable of being delayed is 59/60.

FIG. 3B illustrates a changed period of a card emulation mode according to the exemplary embodiment of the present invention.

When a user performs NFC using an electronic device in the prior art, because NFC modes are uniformly repeated, there is a problem in that convenience of the user is not reflected. That is, there is a problem in that there is no method of adjusting a period of an NFC mode according to an NFC mode frequently used by the user. However, in accordance with the exemplary embodiment of the present invention, there is a method of monitoring an NFC mode performed within a set time in real time and efficiently adjusting a period of the NFC mode.

A description of the present invention will now be given with reference to FIG. 3B.

It may be verified that 59t which is the initial default value of the period 301 of the card emulation mode of FIG. 3A is changed to 29t which is an initial default value of a new period 303 of a card emulation mode. In more detail, in accordance with the exemplary embodiment of the present invention, if an electronic device determines that NFC is performed, the electronic device monitors the performed NFC mode in real time and adjusts a period 303 of the card emulation mode automatically according to the frequency of use of the NFC mode of the user. As shown in FIG. 3B, the electronic device verifies that the frequency of use of the read/write mode and P2P mode, performed in the period 304, is high and adjusts the period 303 of the card emulation mode from 59t to 29t. That is, the electronic device fixes the period 304 of the read/write mode and P2P mode which is a mode in which the frequency of use of the user is high to 1t. However, as a result, because the entire period of NFC modes is reduced by half, the electronic device effectively increases the period 304 of the read/write mode and P2P mode relative to the period 303 of the card emulation mode. Accordingly, when the user wants to perform NFC necessary for performing the read/write mode and P2P mode using the electronic device, a rate at which NFC may be performed without a time delay is 1/30. In the same sense, when the user wants to perform NFC necessary for performing the read/write mode and P2P mode, a time rate capable of being delayed is 29/30. On the other hand, when the user wants to perform NFC necessary for performing the card emulation mode, a rate at which NFC may be performed without a time delay is 29/30. In the same sense, when the user wants to perform NFC necessary for performing the card emulation mode, a time rate capable of being delayed is 1/30.

As described above, when an NFC mode is performed, the electronic device according to the exemplary embodiment of the present invention monitors the frequency of use of the performed NFC mode in real time and adjusts periods of the respective NFC modes automatically. Herein, it is clear that a reduced period of the card emulation mode may not be less than a minimum threshold value, such as 30t, although the period of the card emulation mode is reduced. That is, this is because a minimum period of the card emulation mode must exist although the electronic device determines that the frequency of use of the card emulation mode is low.

Figure 4A:
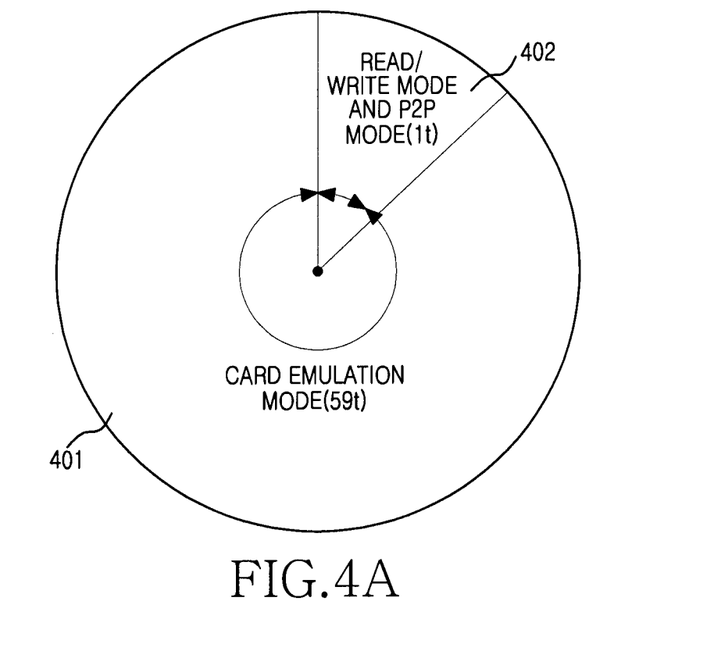
FIGS. 4A and 4B illustrate a process of adjusting a period of a card emulation mode according to a method of the exemplary embodiment of the present invention.
Figure 4B:
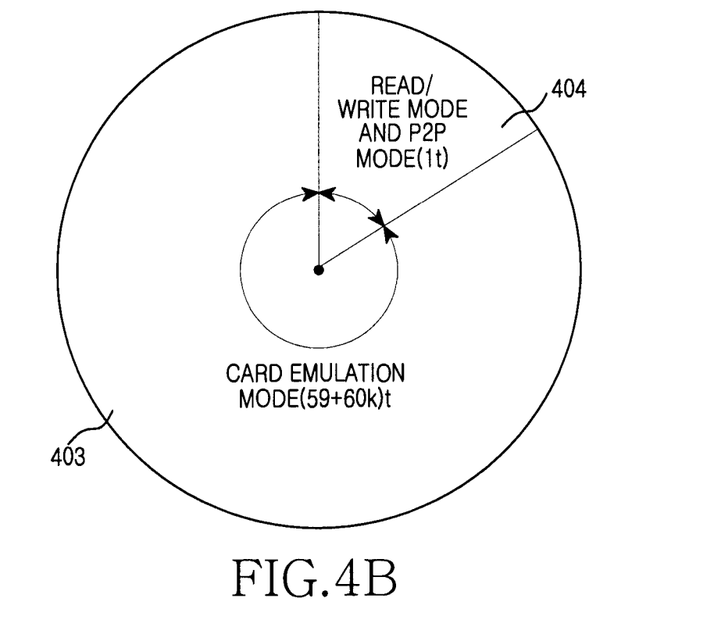

FIGS. 4A and 4B illustrate a process of adjusting a period of a card emulation mode according to a method of the exemplary embodiment of the present invention. FIG. 4A illustrates periods of NFC modes according to default values which are set for the first time. In more detail, when an electronic device performs NFC, periods of NFC modes are set according to default values which are set for the first time.

A description of the present invention will now be given with reference to FIG. 4A.

An initial default value is set to, for example, 59t in a period 401 of a card emulation mode and an initial default value is set to, for example, 1t in a period 402 of a read/write mode and P2P mode. In more detail, the entire period set by a user is 60t. In 60t, which is the entire period for NFC modes, the period 401 of the card emulation mode is set to 59t and the period 402 of the read/write mode and P2P mode is set to 1t. That is, when the user wants to perform NFC using an electronic device, a time rate of 59/60 corresponds to the period 401 of the card emulation mode and a time rate of 1/60 corresponds to the period 402 of the read/write mode and P2P mode. Accordingly, when the user wants to perform NFC necessary for performing the card emulation mode using the electronic device, a rate at which NFC may be performed without a time delay is 59/60. In the same sense, when the user wants to perform NFC necessary for performing the card emulation mode, a time rate capable of being delayed is 1/60. On the other hand, when the user wants to perform NFC necessary for performing the read/write mode and P2P mode using the electronic device, a rate at which NFC may be performed without a time delay is 1/60. In the same sense, when the user wants to perform NFC necessary for performing the read/write mode and P2P mode, a time rate capable of being delayed is 59/60.

FIG. 4B illustrates a changed period of a card emulation mode after an method is applied according to the exemplary embodiment of the present invention.

As shown in FIG. 4B, it may be verified that a period 404 of a read/write mode and P2P mode 404 is fixed to 1t which is the default value which is set for the first time and a period 403 of a card emulation mode is changed to (59t+60k)t. The changed period of the card emulation mode 403 is determined according to Equation 1.

$$\text{new period of card emulation mode} = \text{previous period of card emulation mode} + \Delta t \times (CN - RWN + K). \quad (1)$$

Herein, $\Delta t$ represents a set unit of time in which the method tracks and count the number of times each NFC mode is performed, and the set unit of time may be a predetermined unit of time or may be set by a user or by the manufacturer of the electronic device. CN represents the number of operations of the card emulation mode per unit of time. RWN represents the number of operations of the read/write mode per unit of time. K represents a predetermined correction constant. The new period of the card emulation mode shown in FIG. 4B is determined through the following example. That is, the new period of the card emulation mode is a value determined in which the previous value of the card emulation mode is 59, $\Delta t$ is 60, the number of operations of the card emulation mode per unit time is 2, and the number of operations of the read/write mode per unit time is 1. If NFC is not performed in a unit of time when the NFC modes are tracked and counted, the new period of the card emulation mode is determined to be the previous period of the card emulation mode plus $\Delta t(K)$. As a result, it may be known that the period of the card emulation mode is increased depending on K which is a predetermined correction constant. When a user performs NFC using an electronic device of the prior art, because NFC modes are uniformly repeated, there is a problem in that convenience of the user is not reflected. That is, there is a problem in that there is no method in the prior art of adjusting a period of an NFC mode according to an NFC mode frequently used by the user. However, in accordance with the exemplary embodiment of the present invention, there is a method of monitoring an NFC mode performed within a time set by the user in real time and adjusting a new period of the card emulation mode according to Equation 1 to improve convenience of the user.

In one exemplary embodiment, the predetermined correction constant K may be set to zero. In an alternative exemplary embodiment, the predetermined correction constant K may be set using methods known in the art for adjusting periods for performing NFC modes. For example, when CN=3 and RWN=4 but a user do not want to change the period of card emulation mode, K may be set 1. For an alternative example, when there are no use of the card emulation mode and the read/write mode for a period of time (that is, CN=0, RWN=0) but a user want to increased the period of card emulation mode, K is used for increasing the period of card emulation mode.

Figure 5:
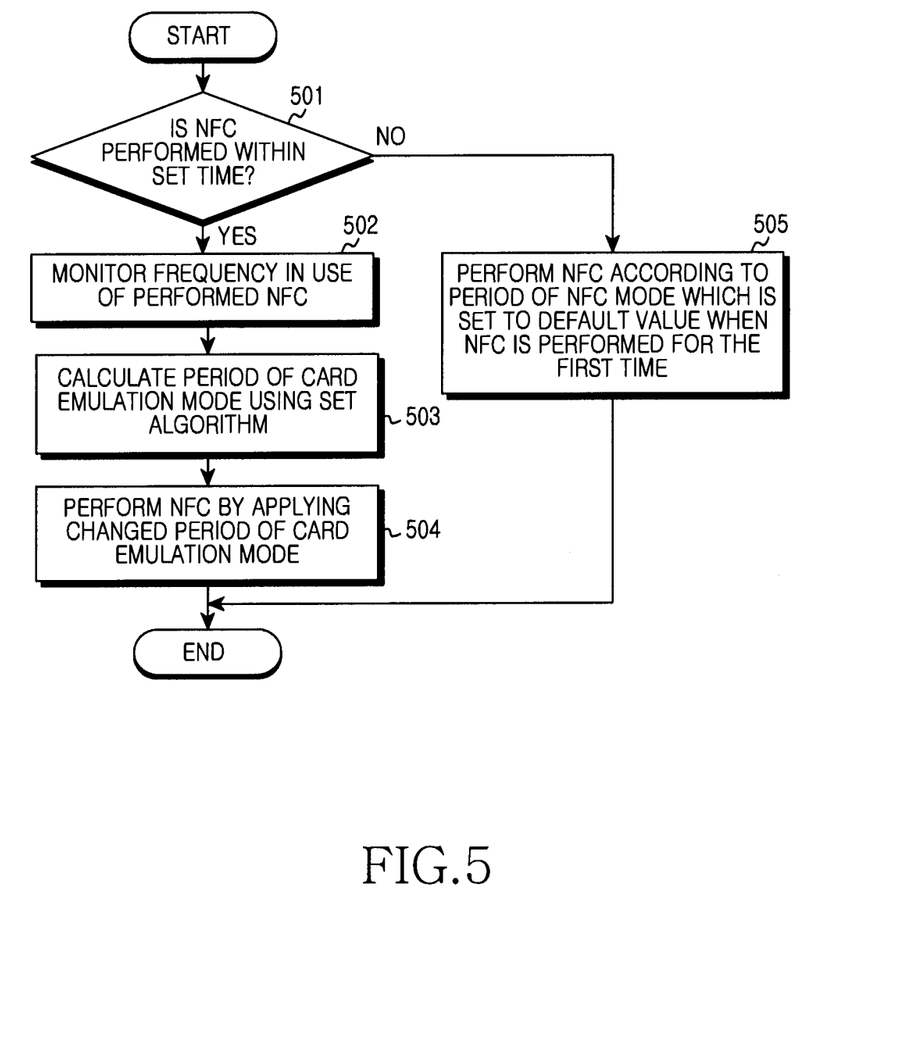
FIG. 5 is a flow chart illustrating a process of adjusting a period of a card emulation mode in an electronic device according to the exemplary embodiment of the present invention.

FIG. 5 is a flow chart illustrating a process of adjusting a period of a card emulation mode in an electronic device.

As shown in FIG. 5, the electronic device determines whether NFC is performed within a set time in step 501. First of all, NFC modes include a card emulation mode, a read/write mode, and a P2P mode. The respective NFC modes are sequentially repeated by a set period. Because the electronic device according to the exemplary embodiment of the present invention adjusts a period of the card emulation mode among the NFC modes, the electronic device determines whether the NFC is performed within the set time.

If it is determined in step 501 that the NFC is performed within the set time, the electronic device monitors the frequency of use of the performed NFC and various NFC modes in step 502. In more detail, the electronic device according to the exemplary embodiment of the present invention monitors the frequency of use of an NFC mode in which the NFC is performed in real time and changes a period of the card emulation mode by referring to the frequency of use of a user of such card emulation. That is, the electronic device reflects the frequency of use of an NFC mode changed in real time and changes a period of the card emulation mode without fixing periods of the respective NFC modes. Accordingly, the electronic device monitors the frequency of use of the NFC mode performed by the user in real time to ascertain the frequency of use of the performed NFC.

The electronic device calculates a period of the card emulation mode using a predetermined method in step 503. In more detail, the electronic device fixes a period of the read/write mode and P2P mode, changes a period of the card emulation mode, and adjusts the entire period of NFC modes. For example, if the electronic device monitors that NFC necessary for performing the card emulation mode is mainly performed, the electronic device has an advantage in that a delay time capable of being generated during NFC is prevented by increasing a period of the card emulation mode. Also, the electronic device has an effect on power reduction by reducing the entire period of the read/write mode and P2P mode in which power consumption is relatively high in the electronic device.

The electronic device, which calculates the period of the card emulation mode using the predetermined method in step 503, applies the changed period of the card emulation mode and performs NFC in step 504. In more detail, the electronic device applies a new period of the card emulation mode, which is calculated by the method according to the exemplary embodiment of the present invention, to a period of an NFC mode and performs NFC continuously. That is, the electronic device improves convenience of the user by reflecting a communication environment changed in real time without using fixed and standardized periods of NFC modes. The method of FIG. 5 then ends.

Referring back to FIG. 501, if it is determined that the NFC is not performed within the set time in step 501, the electronic device sets a period of an NFC mode when performing NFC for the first time to a default value and performs NFC in step 505. In more detail, a period of an NFC mode is set according to a default value which is set for the first time when the electronic device performs NFC. That is, because the electronic device does not monitor NFC which is not yet performed, the period of the NFC mode is set to the default value which is set for the first time and NFC is performed. The method of FIG. 5 then ends.

Figure 6:
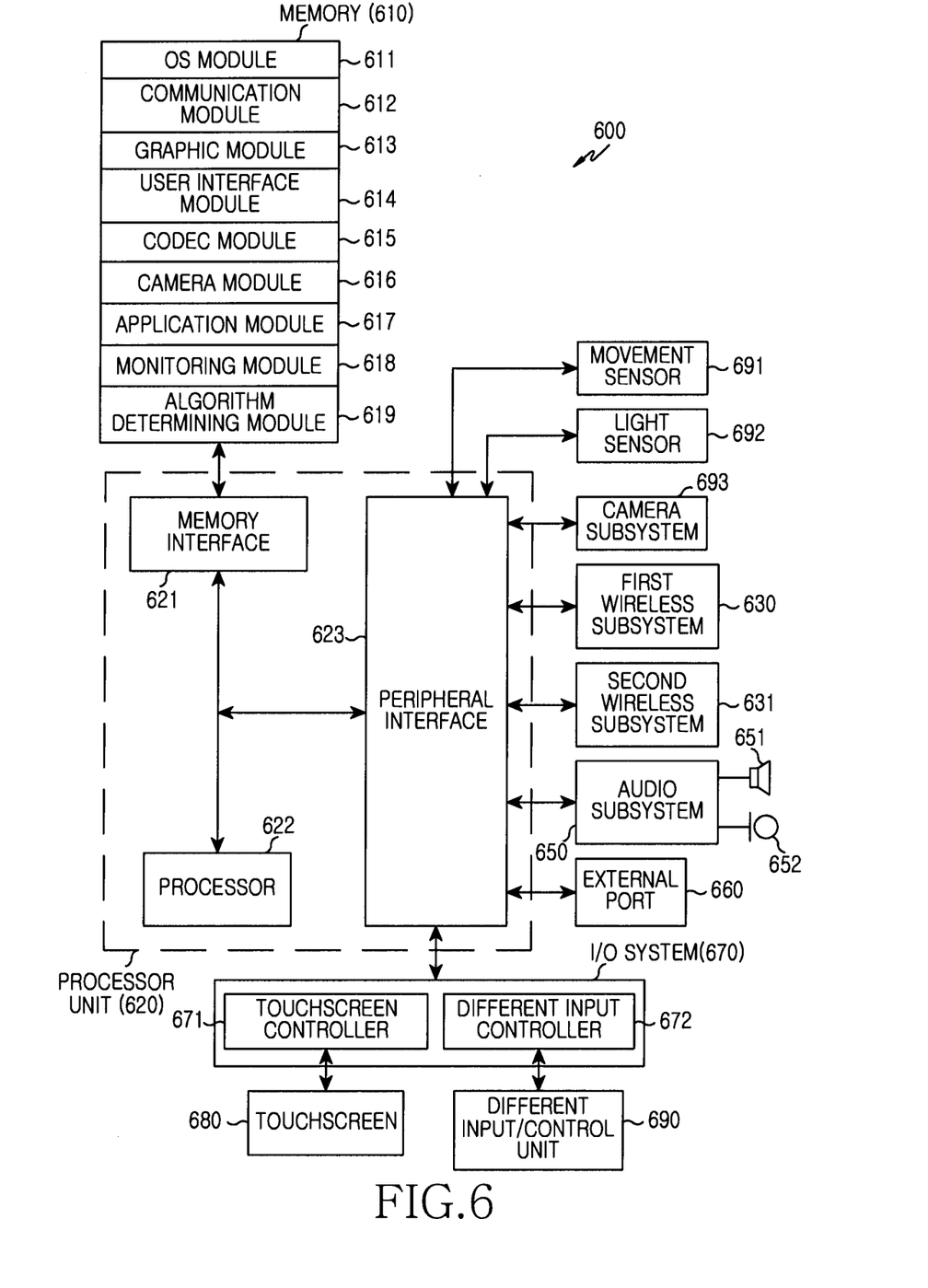
FIG. 6 is a block diagram illustrating a configuration of an electronic device according to the exemplary embodiment of the present invention.

FIG. 6 is a block diagram illustrating a configuration of an electronic device according to the exemplary embodiment of the present invention for performing the method of FIG. 5 and the features of the present invention described herein.

This electronic device 600 may be a portable electronic device. For example, electronic device 600 may be a portable terminal, a mobile phone, a mobile pad, a media player, a tablet computer, a handheld computer, or a Personal Digital Assistant (PDA). Also, the electronic device may be a certain portable electronic device including a device in which two or more functions are combined among these devices.

This electronic device 600 includes a memory 610, a processor unit 620, a first wireless communication subsystem 630, a second wireless communication subsystem 631, an external port 660, an audio subsystem 650, a speaker 651, a microphone 652, an Input/Output (I/O) system 670, a touch screen 680, other or different input/control devices or units 690, a motion or movement sensor 691, an optical or light sensor 692, and a camera subsystem 693. The memory 610 and the external port 660 may be a plurality of memories and external ports, respectively.

The processor unit 620 may include a memory interface 621, one or more processors 622, and a peripheral interface 623. In some cases, the whole processor unit 620 is referred to as a processor. In accordance with the exemplary embodiment of the present invention, the processor unit 620 adjusts a period of a card emulation mode according to the frequency of use of an NFC mode, performs NFC according to a period of an NFC mode in which a period of an NFC mode is set to a default value when NFC is performed for the first time, and fixes a period of a read/write mode and P2P mode among NFC modes. In more detail, when NFC is performed, the processor unit 620 ascertains the frequency of use of the card emulation mode and the read/write mode and P2P mode and adjusts periods of the respective NFC modes in real time. That is, the processor unit 620 monitors the frequency of use which is changed in real time from a default value which is set for the first time, fixes the period of the read/write mode and P2P mode, adjusts the period of the card emulation mode, and adjusts the entire period of the NFC modes. For example, the processor unit 620 calculates the period of the card emulation mode using the predetermined method shown in FIG. 5 and described herein. In more detail, the processor unit 620 fixes the period of the read/write mode and P2P mode, changes the period of the card emulation mode, and adjusts the entire period of the NFC modes. That is, if the processor unit 620 monitors that NFC necessary for performing the card emulation mode is mainly performed, the processor unit 620 increases the period of the card emulation mode and prevents a delay time capable of being generated during NFC. The processor 622 executes several software programs and performs several functions for the electronic device 600. Also, the processor 622 performs processing and control for voice communication and data communication. Also, in addition to these functions, the processor 622 executes a specific software module and/or a command set stored in the memory 610 and plays a role in performing several specific functions corresponding to the software module. That is, the processor 622 operates with the software modules stored in the memory 610 and performs the method according to the exemplary embodiment of the present invention.

The processor 622 may include one or more data processors, an image processor, or a codec. The processor 622 may separately include the data processors, the image processor, or the codec. Also, the processor 622 may include several processors for performing different functions. The peripheral interface 623 connects the I/O system 670 of the electronic device 600 and several peripheral devices to the processor 622 and the memory 610 though the memory interface 621.

A variety of components of the electronic device 600 may be coupled by one or more communication buses or stream lines, represented by the lines and arrows connecting the various components.

The external port 660 is used to connect the electronic device 600 to another electronic device directly or connect the electronic device 600 to another electronic device indirectly through a network (e.g., the Internet, an intranet, a wireless Local Area Network (LAN), etc.). For example, the external port 660 may be, but is not limited to, a Universal Serial Bus (USB) port, a port compatible with FIREWIRE, a serial bus interface standard for high-speed communications and isochronous real-time data transfer, commercially available from APPLE CORPORATION, etc.

The motion or movement sensor 691 and the optical or light sensor 692 may be connected to the peripheral interface 623 and may perform several functions. For example, the motion or movement sensor 691 and the optical or light sensor 692 may connect to the peripheral interface 623, may sense motion of the electronic device 600, and may sense light from the outside, respectively. Furthermore, a position measurement system and other sensors such as a temperature sensor and a bio-sensor may connect to the peripheral interface 623 and may perform related functions.

The camera subsystem 693 may perform a camera function including a photo and video clip recording function.

The optical or light sensor 692 may be a Charge Coupled Device (CCD) or a Complementary Metal-Oxide Semiconductor (CMOS) device.

A communication function is performed through the wireless communication subsystems 630 and 631. Each of the wireless communication subsystems 630 and 631 may include a radio frequency receiver and transceiver and/or a beam (e.g., infrared ray) receiver and transceiver. The first communication subsystem 630 and the second communication subsystem 631 may be classified according to a communication network through which the electronic device 600 communicates. For example, the communication network may be, but is not limited to, a Global System for Mobile communication (GSM) network, an Enhanced Data GSM Environment (EDGE) network, a Code Division Multiple Access (CDMA) network, a W-CDMA network, a Long Term Evolution (LTE) network, an Orthogonal Frequency Division Multiple Access (OFDMA) network, a WI-FI network implementing WI-FI being a wireless technology for data exchange over a computer network, commercially available from the WI-FI ALLIANCE, a WiMax network, or/and a BLUETOOTH network implementing BLUETOOTH, a short range wireless communications technology at the 2.4 GHz band, commercially available from the BLUETOOTH SPECIAL INTEREST GROUP, INC. Each of the communication subsystems 630 and 631 may include a communication subsystem designed to be operated through the communication network. Herein, in accordance with the exemplary embodiment of the present invention, because it is necessary to perform WI-FI communication through the WI-FI network, as shown in FIG. 6, one of the wireless communication subsystems 630 and 631 may be operated through the WI-FI network. The wireless communication subsystems 630 and 631 may be combined and configured as one wireless communication subsystem.

The audio subsystem 650 may connect to the speaker 651 and the microphone 652 and may be responsible for inputting and outputting an audio stream, such as a voice recognition function, a voice copy function, a digital recording function, and a phone call function. That is, the audio subsystem 650 communicates with a user through the speaker 651 and the microphone 652. The audio subsystem 650 receives a data stream through the peripheral interface 623 of the processor unit 620 and converts the received data stream into an electric stream or signal. The converted electric stream or signal is transmitted to the speaker 651. The speaker 651 converts the electric stream or signal into a sound wave to which a user may listen and outputs the converted sound wave. The microphone 652 converts a sound wave transmitted from the user or other sound sources into an electric stream or signal. The audio subsystem 650 receives the converted electric stream from the microphone 652. The audio subsystem 650 converts the received electric stream or signal into an audio data stream and transmits the converted audio data stream to the peripheral interface 623. The audio subsystem 650 may include an attachable and/or detachable earphone, headphone, or headset.

The I/O system 670 may include a touch screen controller 671 and/or other or different input controllers 672. The touch screen controller 671 may be coupled to the touch screen 680. The touch screen 680 and the touch screen controller 671 may detect, but are not limited to, contact, near-contact, and/or motion or the stopping of contact and/or motion of a user's finger or stylus using not only capacitive, resistive, infrared ray, and surface acoustic wave technologies for determining one or more contact or near-contact points with the touch screen 680 but also a known multi-touch sensing technology including other proximity sensor arrangement or other elements known in the art. The other or different input controllers 672 may be coupled to the other or different input/control device or unit 690. The other or different input/control device or unit 690 may be pointer devices such as one or more buttons, a rocket switch, a thumb-wheel, a dial, a stick, and/or a stylus.

The touch screen 680 provides an input/output interface between the electronic device 600 and the user. That is, the touch screen 680 transmits a touch input of the user to the electronic device 600. Also, the touch screen 680 is a medium for displaying an output from the electronic device 600 to the user. That is, the touch screen 680 displays a visual output to the user. This visual output may be a text type, a graphic type, a video type, and a combined type of such text, graphic, and video types.

The touch screen 680 may be any one of several displays known in the art. For example, the touch screen 680 may be, but is not limited to, a Liquid Crystal Display (LCD), a Light Emitting Diode (LED), a Light emitting Polymer Display (LPD), an Organic Light Emitting Diode (OLED), an Active Matrix Organic Light Emitting Diode (AMOLED), or a Flexible LED (FLED).

The memory 610 may be coupled to the memory interface 621. The memory 610 may include a high-speed Random Access Memory (RAM) such as one or more magnetic storages, a non-volatile memory, one or more optical storages, and/or a flash memory (e.g., a NAND flash memory or a NOR flash memory).

The memory 610 stores data and software components. The software components include an Operating System (OS) module 611, a communication module 612, a graphic module 613, a user interface module 614, a CODEC module 615, a camera module 616, one or more application modules 617, a monitoring module 618, an algorithm or method determining module 619, etc. Also, the modules which are the software components may be expressed in a set of instructions. Accordingly, the modules are expressed in an instruction set. Also, the modules are expressed in programs or applications. The stored data includes the values of the various periods of the card emulation mode, the read/write mode, and the P2P mode, including the default period values, initial period values, previous period values, and current period values, which are set by the user or at the time of manufacture of the electronic device, and which are changed based on the frequency of use of the NFC modes, as described herein in the present invention.

The OS module 611 (e.g., an embedded OS such as WINDOWS, an operating system commercially available from MICROSOFT CORPORATION, as well as Linux, Darwin, RTXC, UNIX, OS X, or VxWorks) includes several software components for controlling a general system operation. For example, control of this general system operation may include memory management and control, storage hardware (device) control and management, power control and management, etc. This OS module 611 also performs a function for smoothly communicating between several hardware (devices) and software components (modules).

The communication module 612 may communicate with other electronic devices such as a computer, a server, and/or a portable terminal through the wireless communication subsystems 630 and 631 or the external port 660.

The graphic module 613 includes several software components for providing and displaying graphics on the touch screen 680. The term "graphics" is defined herein as text, web pages, icons, digital images, videos, animations, etc.

The user interface module 614 includes several software components related to a user interface. The user interface module 614 includes contents about whether a state of a user interface is changed to any state, whether a state of a user interface is changed in any condition, etc.

The CODEC module 615 may include software components related to encoding and decoding of video files. The CODEC module 615 may include a video stream module such as an MPEG module and/or an H204 module. Also, the CODEC module 615 may include a code module for several audio files such as AAA files, AMR files, and WMA files. Also, the CODEC module 615 includes an instruction set corresponding to the exemplary embodiment of the present invention.

The camera module 616 includes camera-related software components capable of performing camera-related processes and functions.

The application module 617 includes at least one of a browser function, an email function, an instant message function, a word processing function, a keyboard emulation function, an address book function, a touch list function, a widget function, a Digital Right Management (DRM) function, a voice recognition function, a voice copy function, a position determining function, a location based service function, etc.

The monitoring module 618 verifies the frequency of performance of the card emulation mode, the read/write mode, and P2P mode within a time set by the user.

The algorithm or method determining module 619 adjusts a period of the card emulation mode according to FIG. 5 and the method of the present invention described herein.

A variety of functions of the electronic device 600, which are described above or to be described later, may be executed by one or more streaming processing, hardware including an Application Specific Integrated Circuit (ASIC), software, and/or combination of them.

The above-described apparatus and methods according to the present invention can be implemented in hardware or firmware, or as software or computer code, or combinations thereof. In addition, the software or computer code can also be stored in a non-transitory recording medium such as a CD ROM, a RAM, a ROM whether erasable or rewritable or not, a floppy disk, CDs, DVDs, memory chips, a hard disk, a magnetic storage media, an optical recording media, or a magneto-optical disk or computer code downloaded over a network originally stored on a remote recording medium, a computer readable recording medium, or a non-transitory machine readable medium and to be stored on a local recording medium, so that the methods described herein can be rendered in such software, computer code, software modules, software objects, instructions, applications, applets, apps, etc. that is stored on the recording medium using a general purpose computer, a digital computer, or a special processor or in programmable or dedicated hardware, such as an ASIC or FPGA. As would be understood in the art, the computer, the processor, microprocessor controller or the programmable hardware include volatile and/or non-volatile storage and memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, the program may be electronically transferred through any medium such as communication signals transmitted by wire/wireless connections, and their equivalents. The programs and computer readable recording medium can also be distributed in network-coupled computer systems so that the computer readable code is stored and executed in a distributed fashion.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. An operation method of an electronic device, the operation method comprising:
   determining whether Near Field Communication (NFC) is performed in an NFC mode among a plurality of NFC modes within a set time;
   monitoring a frequency of use of the NFC mode when it is determined that the NFC is performed; and
   adjusting a performance period of a card emulation mode among the NFC modes according to the frequency of use of the NFC mode wherein the NFC is sequentially performed by performance periods in which the card emulation mode, a read/write mode, and a peer-to-peer mode are set.

2. The operation method of claim 1, further comprising, when it is determined that the NFC is not performed, performing the NFC according to a performance period of an NFC mode in which the performance period of the NFC mode is set to a default value when the NFC is performed for the first time.

3. The operation method of claim 1, wherein the monitoring of the frequency of use of the NFC mode comprises verifying the frequency of use of the card emulation mode, a read/write mode, and a peer-to-peer (P2P) mode within the set time.

4. The operation method of claim 1, wherein the adjustment of the performance period of the card emulation mode according to the frequency of use of the NFC mode comprises fixing a performance period of a read/write mode and a peer-to-peer (P2P) mode among periods of the NFC modes.

5. The operation method of claim 1, wherein the performance period of the card emulation mode is adjusted according to:

$$\text{a new period of the card emulation mode} = \text{a previous period of the card emulation mode} + \Delta t \times (CN - RWN + K)$$

where $\Delta t$ represents a set unit of time, CN represents the number of operations of the card emulation mode per unit of time, RWN represents the number of operations of a read/write mode per unit of time, and K represents a predetermined correction constant.

6. The operation method of claim 5, wherein a new period of the card emulation mode is greater than or equal to a minimum threshold value and is less than or equal to a maximum threshold value.

7. The operation method of claim 1, wherein the adjusting the performance period of the card emulation mode among the NFC modes according to the frequency of use of the NFC mode comprises adjusting the performance period of the card emulation mode based on the frequency of use of the NFC mode and a frequency of use of another NFC mode.

8. The operation method of claim 1, further comprising adjusting a performance period of another NFC mode based on the performance period of the card emulation mode.

9. An electronic device comprising:
   a memory for storing a value of a performance period of a Near Field Communication (NFC) mode; and at least one processor coupled to the memory configured to:
determine whether NFC is performed in the NFC mode among a plurality of NFC modes within a set time;
monitor a frequency of use of the NFC mode when it is determined that the NFC is performed; and
adjust the performance period of a card emulation mode among the NFC modes according to the frequency of use of the NFC mode wherein the NFC is sequentially performed by performance periods in which the card emulation mode, a read/write mode, and a peer-to-peer mode are set.

10. The electronic device of claim 9, the at least one processor is configured to performs the NFC according to a performance period of an NFC mode in which the performance period of the NFC mode is set to a default value when the NFC is performed for the first time.

11. The electronic device of claim 9, wherein the memory includes a monitoring module for verifying the frequency of use of the card emulation mode, a read/write mode, and a peer-to-peer (P2P) mode within the set time.

12. The electronic device of claim 9, wherein the at least one processor is configured to fixes a performance period of a read/write mode and a peer-to-peer (P2P) mode among performance periods of the NFC modes.

13. The electronic device of claim 9, wherein the performance period of the card emulation mode is adjusted according to:

$$\text{a new period of the card emulation mode} = \text{a previous period of the card emulation mode} + \Delta t \times (CN - RWN + K)$$

where $\Delta t$ represents a set unit of time, CN represents the number of operations of the card emulation mode per unit of time, RWN represents the number of operations of a read/write mode per unit of time, and K represents a predetermined correction constant.

14. The electronic device of claim 13, wherein a new period of the card emulation mode is greater than or equal to a minimum threshold value and is less than or equal to a maximum threshold value.

15. The electronic device of claim 9, wherein the at least one processor is configured to adjust the performance period of the card emulation mode based on the frequency of use of the NFC mode and a frequency of use of another NFC mode.

16. The electronic device of claim 9, wherein the at least one processor is configured to adjust a performance period of another NFC mode based on the performance period of the card emulation mode.

* * * * *